United States Patent [19]

Schubring et al.

[11] Patent Number: 4,852,477
[45] Date of Patent: Aug. 1, 1989

[54] APPARATUS FOR THE MANUFACTURE OF TEXTURED MEAT AND FISH PRODUCTS

[75] Inventors: Reinhard Schubring; Juergen Witt; Irene Harwardt; Sigrd Neumann, all of Rostock; Christoph Schneider, Kleinmachnow; Gerhard Mieth, Potsdam; Wolfgang Raue, Rostock; Juergen Brueckner, Bergholz-Rehbruecke, all of German Democratic Rep.

[73] Assignee: Institut fuer Hochseefischerei und Fischverarbeitung-Betrieb des VEB Fischkombinat Rostock, Rostock, German Democratic Rep.

[21] Appl. No.: 232,065

[22] Filed: Aug. 11, 1988

Related U.S. Application Data

[62] Division of Ser. No. 90,068, Aug. 27, 1987.

[30] Foreign Application Priority Data

Dec. 3, 1986 [DD] German Democratic Rep. ... 296986
Mar. 6, 1987 [DD] German Democratic Rep. ... 300512

[51] Int. Cl.⁴ .............................................. A23P 1/00
[52] U.S. Cl. .................................... 99/450.2; 99/483; 99/494; 99/516
[58] Field of Search ...................... 99/353, 355, 443 C, 99/426, 450.1, 450.2, 450.6, 452, 460, 477, 483, 484, 485, 494, 516, 534; 17/51, 53, 55; 426/641; 100/153, 176

[56] References Cited

U.S. PATENT DOCUMENTS

| 3,468,675 | 9/1969 | Potzl | 426/641 |
|---|---|---|---|
| 3,778,521 | 12/1973 | Fisher et al. | 99/516 |
| 3,926,105 | 12/1975 | Warning, Sr. | 99/423 |
| 4,119,741 | 10/1978 | Stahler | 426/641 |
| 4,170,659 | 10/1979 | Totino et al. | 99/352 |
| 4,245,552 | 1/1981 | Small et al. | 99/483 |
| 4,548,571 | 10/1985 | Suzuki | 99/450.1 |
| 4,665,811 | 5/1987 | Meyer | 99/460 |
| 4,697,507 | 10/1987 | Nagasaki | 99/443 C |

Primary Examiner—Timothy F. Simone
Attorney, Agent, or Firm—Jordan and Hamburg

[57] ABSTRACT

A process for manufacturing textured meat and fish products includes comminuting muscle flesh to subcellular particle sizes, mixing the comminuted muscle flesh with a texturing agent and texture regulator, freezing the mixture, heating the mixture to pasteurize or sterilize it, crimping the mixture to form a crinkled sheet of dough, folding the crinkled sheet of dough into laminated layers and freezing the folded laminated layers along a predetermined direction to form a desired fibrous structure. The texturing agent is a polyanionic complexing agent, preferably a pectin having a particular degree of esterification, and the texture regulator is one or a mixture of protein-rich products, starch-rich products, fats, and salts of polyvalent cations. The apparatus for implementing the process includes a rolling system of a plurality of cylinders for forming the sheet of dough, a rotating drum for thermally treating the sheet of dough, an immersion bath for chemically treating the sheet of dough, and a folding mechanism for folding the sheet of dough into a plurality of laminated layers.

9 Claims, 4 Drawing Sheets

APPARATUS FOR THE MANUFACTURE OF TEXTURED MEAT AND FISH PRODUCTS

This is a division of application Ser. No. 090,068, filed Aug. 27, 1987.

BACKGROUND OF THE INVENTION

The invention relates to a process and an apparatus for the manufacture of textured meat-like or fish-like products from protein-containing masses, preferably of comminuted muscle meat of marine or land animals, with an extensive similarity to the original muscle texture. The manufactured products have textural and sensory characteristics which make possible their use as partial or complete simulations of meat or fish products for industrial or culinary food preparations.

In the patent literature there are numerous methods proposed for the texturing of proteins, in which extrusion and spinning are the methods of choice for the formation of random or oriented textures. Recently, importance has been attributed to the freeze texturing of protein-rich vegetable or animal raw materials, especially from the point of view of the retexturing of comminuted muscle tissue. In such processes, the flaky textures that are formed are solidified in a subsequent step of the process; such variants are contained, for example, in DE-AS Nos. 2211944 and 2211943. Information is given on the practical performance of freeze-texturing in U.S. Pat. Nos. 4,084,017 and 4,167,550, and in DD Pat. No. 223355, but the processes referred to in the specifications evidently lack the necessary technical and technological reliability.

In order to achieve the formation of fibers in doughs of substances isolated from vegetable protein with a specific moisture content, it is proposed in DE-OS No. 2320782 and U.S. Pat. No. 3,973,044, and in Swiss Pat. No. 554140, to stretch the protein doughs with the formation of folds as the dough passes through two or more rolls revolving at specific speeds, followed by stripping them off. Subsequent manipulation to intensify the formation of fibers and to texturize by heating are said to result in fiber-like and hence meat-like products. Such processes are very expensive, since they require a dry, hydratable protein mixture on the basis of relatively costly substances isolated from proteins. Moreover, the products thus made generally have a boiled-meat character. The important disadvantage of the apparatus described for the practice of these processes consists in their exclusive limitation to stretching and folding. No technically practicable solutions are being offered for the further operations of fiber strengthening and texture fixation which are essential to these processes.

SUMMARY OF THE INVENTION

The object of the invention consists accordingly in the development of a process and apparatus for the manufacture of textured meat-like or fish-like products from protein-containing doughs, which will have a great similarity to the original muscle texture of marine and land animals.

The invention is addressed to the problem of devising process conditions, additives, and a mechanical apparatus which will permit the formation of ordered textures having a preferentially longitudinal alignment and the directional freezing of select doughs containing texturizable protein, with the formation of layered fiber-bundle or segment-like structures having the textural and sensorial characteristics of the original muscle flesh of marine or land animals, largely without regard to raw material composition.

According to the invention, cleaned, and if necessary boned and skinned muscle meat is comminuted to subcellular particle sizes and, with the addition of texturing agents based on protein-rich products, preferably on vegetable protein extracts of a given degree of denaturation, and/or on fats, preferably vegetable oils and soft fats, and/or on salts of polyvalent cations, preferably calcium salts, it is mixed and then subjected to freezing followed by heating in conjunction with pasteurization or sterilization.

As it has been found, the formation of ordered structures having a preferentially longitudinal alignment in freezing comminuted muscle meat depends, unless special freezing techniques are applied, on two essential requirements.

On the one hand, the raw substances to be retextured must be comminuted to subcellular particle sizes of 10 to 200 microns, preferably 20 to 100 microns, and, on the other hand, the addition of texturizing agents based on polyanionic complexing agents, preferably pectins with a given degree of esterification from 30 to 80%, preferably 35 to 65%, is necessary.

As it has furthermore been found, the additional use of texturizing agents based on proteins, starchy products, fats and/or salts of polyvalent cations has proven necessary with a view to a desirable compensation of differences, specific to the raw materials, in the composition of the species to be processed, which result in undesirable differences in texture from standard products having the original muscle texture.

The mass ratio of texturizing agents and texture regulators that are to be selected depends accordingly to a great extent on the composition of the raw goods, especially on the content of basic components, crude protein, crude fat and water, so that the particular formulation of the finished mass that is to be restructured must be determined by preliminary experiments, taking into account the following knowledge gained by the invention.

The amount of the polyanionic complexing agents functioning as texturizing agents to be added must be, depending on the raw material composition, no more than 20%, preferably from 1 to 5%, of the total protein content, and in the case of the addition of a foreign protein, a total mass ratio of muscle protein to foreign protein of 20:1 to 1:1, preferably 10:1 to 3:1, is to be maintained.

The amount of the protein-rich products used as texture regulators to be added is to be, depending on the raw material composition, no more than 50%, preferably 10 to 20%, of the mass of the raw material, while the degree of denaturation is to be between 25 and 75% of the nitrogen solubility index of the proteins.

The amount of the starchy products used as texture regulators to be added must amount to no more than 5%, preferably 1 to 3%, of the mass of the raw material, depending on the raw material composition.

The amount of the fats furthermore used as texture regulators to be added is to amount to a maximum of 50%, preferably 10 to 40%, depending on the raw material composition; the mass ratio of total protein to total fat is to be adjsuted to 1:0.5 to 1:3, preferably 1:1 to 1:2.

The amount of the salts of polyvalent cations also used as texture regulators to be added is to amount, depending on the nature and amount of the polyanionic complexing agent and the protein added, to 0.1 to 1.0%, preferably 0.25 to 0.5%, of the total amount of the mass to be retexturized.

Lastly, it has been found that a previous slow freezing of the raw materials or their mixtures used for retexturing, at temperatures $\leq -15°$ C., in combination with a thawing at temperatures $\geq 30°$ C., followed by fast freezing at temperatures $\leq -50°$ C., has a favorable effect on the formation of laminar textures by predenaturing the muscle proteins.

Likewise positive is the effect of a denaturing pretreatment of the raw materials by the action of cold and/or heat at temperatures $\leq -15°$ C. and $\geq 50°$ C., and/or salting at salt contents $\leq 10\%$.

The process of the invention has the general advantage over previously known freeze texturing processes that it achieves a high degree of organization in the finished product, combined with a high effectivity that is largely independent of the raw material composition, the resulting end products having muscle-like textures with the typical sensory and texture characteristics. Another advantage of the invention is that muscle meat of different animal species, e.g., fish, krill, poultry, cattle, swine, etc., can be retextured.

Technologically, the manufacture of textured products having a great resemblance to the original muscle substance from the homogeneous, protein-rich mass is accomplished by a process in which the prepared mass is transformed by rolling and crimping to a crinkled sheet of dough, this sheet is stabilized thermally and/or chemically, if desired, according to the intended character of the product, then folded in layers and frozen such that the chief freezing direction is at a predetermined angle to the longitudinal direction of the crinkling of the sheet. The stabilizing treatment of the homogeneous mass during the formation of the dough sheet or afterward is performed by a thermal treatment, namely with the action of heat or cold, at temperatures of $\geq 40°$ C. or $\leq -15°$ C. and/or by treatment in an acetic acid/sodium chloride solution in which the concentration of the two components ranges from 0.5 to 15%, preferably from 1 to 5%, of the total mass of the solution.

Another feature of the invention is that the stabilizing treatment of the homogeneous mass takes place during the formation of the dough sheet or afterward by a thermal treatment, and in a second step by the treatment in the acetic acid/sodium chloride solution.

The crinkled sheet of dough is exposed, before being folded in layers, to a liquid which contains flavoring additives and/or polar agents having, if desired, sticking or anti-sticking or crosslinking action and/or nonpolar agents. The process is furthermore characterized in that the sticking, anti-sticking or crosslinking agents are neutral polysaccharides, preferably native or modified starches, neutral fats, preferably vegetable oils or fish oils, or organic and nonorganic polyanionic compounds, preferably pectins, or polyvalent cations, preferably soluble calcium salts, anion-active or amphoteric lipids, preferably partial fatty acid ester of derivatized glycerides and phosphatides, and/or protein extracts, preferably from oilseed or leguminous seed proteins.

In one special embodiment, the end product can be composed of two or more dough sheets, in which different given mass compositions are present, and/or a thermal treatment and/or treatment in an acetic acid/sodium chloride solution is performed.

The process is furthermore characterized in that, for the establishment of a main freezing direction in the manufacture of oblong portion pieces from the dough sheet folded in layers, the two surfaces perpendicular to the two shorter dimensions of a piece are insulated such that the freezing runs preferentially in the third dimension which coincides with the longitudinal direction of the crinking.

The angle between the main freezing direction and the longitudinal direction of the crinkling amounts, in the interest of the desired fiber structure, to between 0 and 45 degrees, preferably 0 to 20 degrees.

In one special embodiment the two surfaces perpendicular to the shortest dimensions are insulated such that the freezing runs preferentially in the two remaining dimensions.

In the manufacture of a large frozen block which is later to be divided into oblong portions, the longitudinal direction of the crinkling is established such that it coincides with the smallest dimension of the large frozen block.

The smallest frozen block dimension amounts ot 60 to 120 mm, preferably 80 to 95 mm.

The process, lastly, is characterized in that the portions formed from the folded layers are frozen without a solid covering.

The plant for the performance of the process has a rolling system consisting of a plurality of rolls, heated if desired, with different rotatory speeds, a drum for the thermal treatment, namely a heating or freezing drum, an endless conveyor running through an immersion bath, systems for spraying polar or nonpolar liquids, plus a folding system for the dough sheet, as well as a filling system for filling the freeze frame.

Instead of the folding system and the filling system, a strand folding system with a severing device can be used.

Within the plant, the rolling system can be combined with another rolling system of the same kind and with dough strip laminating cylinders.

The filling system is characterized by the fact that it consists of an endless conveyor with an abutment plate and dividing knives disposed athwart the direction of movement and driven step-wise.

The dividing knives including their drive chains are driven in a guide by means of a hydraulic cylinder between a raised and a lowered position.

The freeze frame has a mold made of hollow members filled with insulating material such as polystyrene or polyurethane as well as a resilient lining, e.g., a corrugated cardboard insert.

BRIEF DESCRIPTION OF THE DRAWINGS

The invention will be better understood by reference to the accompanying drawings, in which.

DETAILED DESCRIPTION OF THE PREFERRED EMBODIMENT

The embodiments of FIGS. 1 to 5 illustrate important operations which improve the retexturability of the material being worked and permit the formation of a texture similar to skeletal muscle.

EMBODIMENT 1

Frozen codfish, beheaded and gutted, is thawed in water and a bone separator separates the fish meat from the other body components. The chopped fish, largely free of skin and bones, which is obtained in this manner is worked in a food processor until the particle size obtained is in the subcellular range (about 35 to 85 microns). This requires 8 to 13 minutes depending on the type of machine used. During the comminution, a 15% sodium chloride solution, used primarily for flavoring purposes, is added in the amount of 10% of the mass of the fish meat, and polyphosphate (e.g., $Na_2P_2O_7$) in crystalline form is also added. The amount added amounts to about 6% of the crude protein content of the fish meat. After the treatment in the food processor has ended the homogenate is packed in synthetic sausage casings for shaping and frozen at about $-20°$ C. in a frozen food chest. When the freezing is finished, or after a longer time for frozen storage at the above-specified temperature, the material is divided while still frozen, after removal of the casings, into portions about 20 mm thick, breaded, and fried in oil at 180° C.

When the product thus treated is eaten it has an extraordinarily high degree of identity with portions of original cod filet, and is superior to the latter in tenderness and juiciness.

EMBODIMENT 2

Fresh-water fish (e.g., roach, bass or perch), used separately or mixed, is prepared (beheaded and gutted), machine-boned, and comminuted, mixed with salt in an amount of 1.5% of the mass of the fish meat, and frozen under industrial conditions in a plate freezer. After several months of frozen storage this intermediate product is raised to about $-5°$ C., coarsely cut up, and worked in a food processor until the particles sizes amount to about 70 to 100 microns. Besides the addition of salt solution described in Example 1, a commercial pectin is added, simultaneously with calcium chloride. The percentages of these components is 1.0% (pectin) and 0.3% (calcium chloride) of the mass of the material to be textured. The rest of the process is performed as in Example 1. The portions obtained after removal of the casing used to shape them are packed together with an aqueous infusion containing suitable flavoring agents, in 250-gram aluminum cans, and after sealing they are sterilized under industrial conditions, the product being left for 20 minutes at a temperature of 121° C. When eaten, the product thus treated has an extraordinarily high identity in its sensory characteristics, to original, likewise sterilized tuna fish.

EMBODIMENT 3

Comminuted mackerel flesh produced from frozen raw fish as in Example 1, is treated with a suspension of a vegetable protein extract (e.g., field bean protein extract) so that the ratio of field bean protein to the crude protein amounts to 1:10. Polyphosphate is added in the amount of 5% of the total protein content of the mixture. With the admixture of a sodium chloride solution as in Example 1, a colloid mill is used to produce a homogeneous mass in which the fish flesh has a particle size of about 90 to 120 microns. For shaping, the fish is packed in a round aluminum can and frozen. The frozen product is processed in a steam chest for 20 minutes after reaching a core temperature of 85° C. The fibrous product has a resemblance to boiled beef.

EMBODIMENT 4

As in Example 2, frozen, comminuted meat from fresh-water fish is used, but it is in the forzen state before separation. In the treatment of the temperature-controlled fish in a food processor, 15% of pectin is added, and it is steeped for 10 hours in an excees of water (with respect to the crude protein content of the fish), and rapeseed oil is added in an amount of 20% of the total mass. The homogeneously comminuted fish is packed in aluminum cans and frozen at $-14°$ C. After 24 hours it is thawed in water at a temperature of 40° C., followed by another freezing, this time using dry ice, i.e., at about $-72°$ C. The products thus treated have, after heating, a very pronounced flaky texture.

EMBODIMENT 5

Mechanically boned turkey meat is coarsely chopped and, after being brought to a temperature of 2° to 4° C., it is comminuted for 10 minutes in a food processor, reducing the particle size to less than 100 microns. During the processing an amount of 15% sodium chloride solution, chilled to 4° C., is added that brings the salt content in the finished mass to 1%. Also, during the comminution in the food processor, such an amount of an aqueous dispersion of field bean extract in water (1:6 by weight) is added that the ratio of turkey meat protein to field bean protein amounts to 11:1. Finally, a quantity of sunflower seed oil amounting to 25% of the total mass is also added during the comminution. The finished mass is shaped into 100 gram portions 20 mm thick, which were breaded and frozen in a conventional industrial belt or spiral freezer.

For eating, the frozen portions were fried in oil at 180° C. The product thus obtained has sensory properties which are very similar to those of original turkey meat.

A description will now be given of the technology for the manufacture of textured products based on the protein masses described above, as well as of the plant required for this purpose.

As shown in FIGS. 1 to 5, the plant includes a heated rolling system 2 for forming a thin, crinkled sheet of dough, a rotating drum for the thermal treatment, namely a freezing or heating drum 4 for the stabilizing of the shape of the sheet of dough or of the dough mass, an immersion bath 10 including an endless belt conveyor 9 which continuously passes the band of sheet dough through a stabilizing solution, a spraying apparatus 13 to remove adhering bath components, a second spray apparatus 14 for the application of a polar or nonpolar fluid, a folding system 15 to form a laminated product of layers of sheet dough, and a filling system 18 for filling a freezing frame 30 with strips of the laminated product in layers one over the other.

Figure 2:
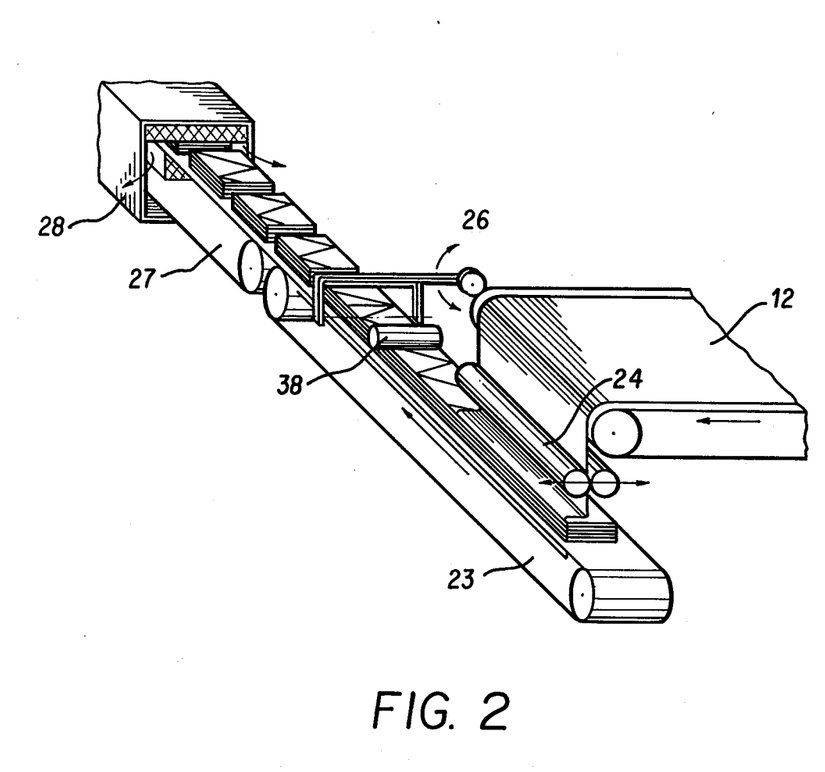
FIG. 2 is a perspective view of a portion of the apparatus according to the present invention, in which, according to the second form of application, the product is made in portion-sized pieces.

Another form of application has, instead of the folding system 15 and the filling system 18, a strand folding system 23 with severing means 26, as shown in FIG. 2

The above-described combination of apparatus can be completed, depending on the type of product, by one or more heated rolling systems 2 (FIG. 5), in wihch a laminated end product is formed by the use of a band laminating cylinder 29.

Figure 3:
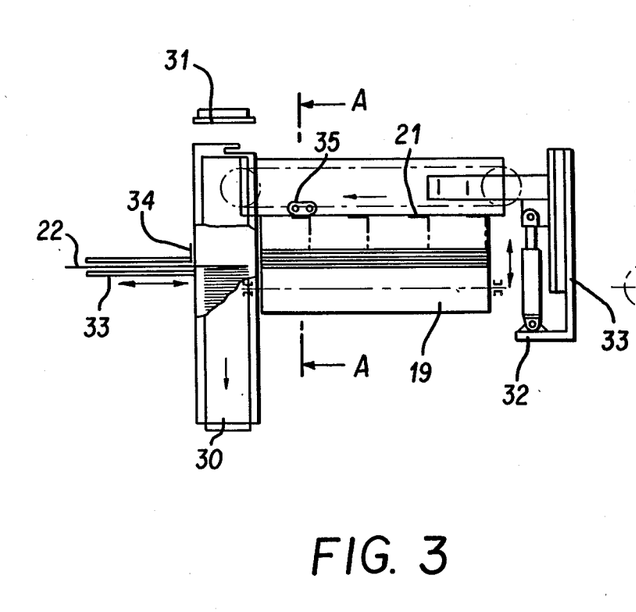
FIG. 3 is a front elevation of a large block frame filling system according to the invention.
Figure 4:
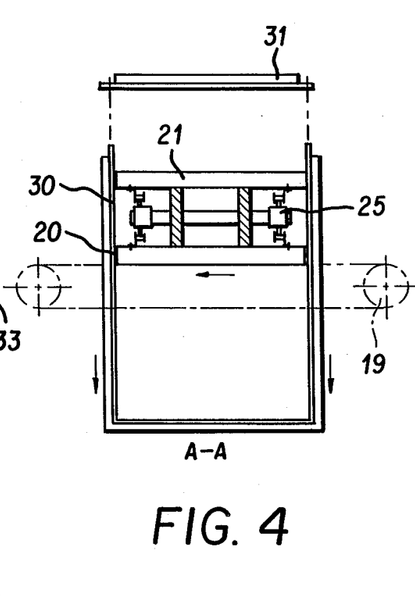
FIG. 4 is a cross section of the large block frame filling system taken along the line A—A of FIG. 3.
Figure 5:
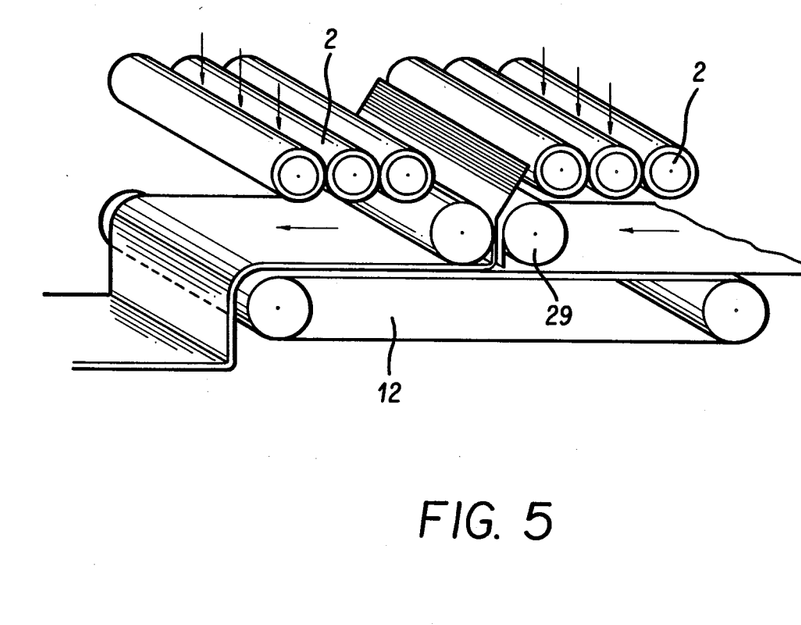
FIG. 5 is a perspective view of an arrangement of, for example, two additional rolling systems for thermally stabilized and nonstabilized strips of dough as a component layer for a layered end product.

The filling system 18 according to the invention is described in detail hereinbelow. It consists of an endless conveyor 19 with a stop gauge 20. Athwart the direction of movement one or more severing knives 21 are disposed, which are moved forward preferably by means of a chain drive 35, step by step through a ratchet drive, stepping motor or the like, such that a strip of the layered product is inserted each time into the freezing frame 30 over the carrier plate 22 disposed above the endless conveyor 19 at the level of the top edge. The freezing frame 30 has a high insulating value, which is provided by the material used and/or by a special hollow frame filled with insulating foam material (polystyrene, polyurethane and the like). To accommodate the increase in bulk produced by the freezing of the dough, a resilient lining is provided in the freezing frame 30 or an elastic insert (e.g., corrugated cardboard). The entire severing knife drive 25 can preferably be moved by a hydraulic cylinder 32 to two end positions, i.e., an upper and a lower, sliding in a guide 33. The carrier plate 22 is placed in cyclical reciprocating movement synchronous with the horizontal inserting action by a drive, preferably a pneumatic cylinder or crank drive, such that briefly an opening corresponding to the horizontal frame cross section is uncovered. The carrier plate 22 is mounted in two guides 39 on which stripping plate 34 rests. The replaceable freezing frame 30 is lowered cyclically after each insertion is completed. Before the filled freezing frame 30 is removed, the loose frame plate 31 is placed on it and locked.

EMBODIMENT 6

Figure 1:
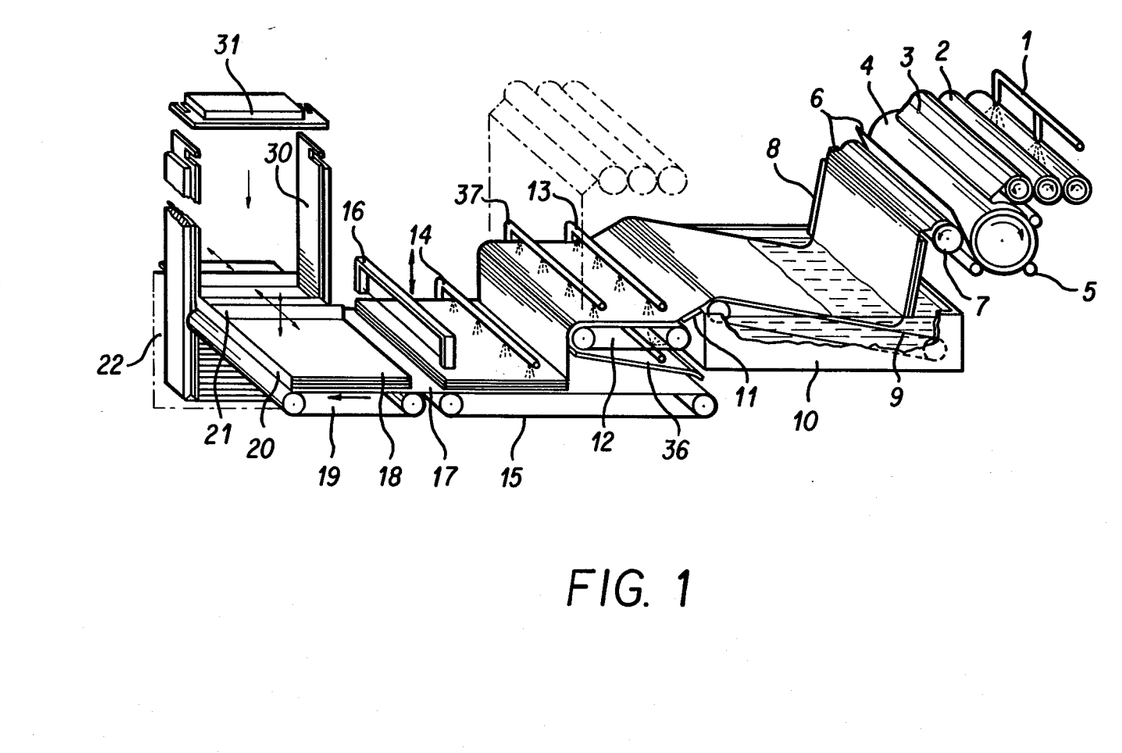
FIG. 1 is a perspective view of an apparatus according to the invention, in which, according to the first form of application, a large frozen block is made.

FIGS. 1 and 2 show the arrangement of a continuously producing plant according to the invention, employed in an application in which frozen fish filet products are imitated by comminution and the retexturing into fish forcemeat.

In an ordinary food processor, a homogeneous fish muscle flesh made from largely skinned and boned flesh of haddocklike fishes, to which 10%, with reference to its mass, of a 15% sodium chloride solution is added for flavor improvement, is pumped into the gap between a pair of counterrotating cylinders of a rolling apparatus 2, while a pump, not further represented, continuously and controllably feeds the pulpy mass through a tube to the nozzle. Advanced by the pair of cylinders, the fish mass comes to a third cylinder, while the circumferential speed of the three rolls increases in the direction of movement at a ratio of 1:2:4 in the case of a cylinder diameter of 50 mm. The minimum gap between the two infeed cylinders amounts to 0.7 mm, and the minimum gap between the second and the final cylinder is 0.15 mm.

All three (and in some cases more cylinders) are equipped with a heating jacket which in the present example permits a surface temperature of about 45° to 50° C. The heating can be performed, for example, by electrical resistance heating or indirectly by hot water, a hot air stream, or other heating media. The fish mass, slightly cooked from the bottom, is continuously stripped from the end cylinder by means of a stripping blade 3. At the same time, the pile-up of the mass against the blade causes a crinkling of the thin sheet of dough.

The sticky strip of dough thus crinkled to a thickness of about 4 mm is transferred to the rotating freezing or heating drum 4. In the present case, the heating of the drum produces a slight additional warming at a surface temperature of 40° C. and at a treatment time of about 15 sec. During the rotation of the drum the sheet of dough is gauged to a uniform thickness by several pressure rollers 5. The dough sheet, guided by the stripping blade 6 onto the deflecting roller 7 is continuously driven on by the endless conveyor 9. The dough sheet, sufficiently stabilized as a result of the two heatings, passes over the transfer plate 11 onto the endless conveyor 12 and is provided with a thin oil film (vegetable oil) by the sprayer 14. According to FIG. 5, a second, unheated dough strip is formed from the same starting mass on a rolling system 2 and is applied to the first dough strip, so that from the endless conveyor 12 a laminated, two-layer strip of dough of different thermal treatment is passed onto the folder 15. The folding of the material is a layered product with a thickness of, for example, 25 mm, is performed by a reciprocating movement of the folder 15 in the form, preferably, of a steel belt conveyor. After the desired thickness, i.e., number of layers, is reached, the drive of the folder 15 performs an additional step forward, so that, simultaneously with the deposit of the first layer of the next stack, the finished stack is transferred to the filler 18, and by the operation of the severer 16, i.e., the lowering and raising of a wire frame, it is cut off. The simultaneously running endless conveyor 19 then takes over the stack entering on the transfer plate 17 and moves it to the abutment 20. The next insertion into the freezing frame 30 is performed by the severing knife drive 25 which is moved by operating the hydraulic cylinder 32 to its lowered position (in FIG. 3 the raised position is represented) with, in this example, all four of its knives 21. When lowered, the severing knives 21 divide the stack of layers into, for example, four strips of equal width. In the following step the severing drive 25, powered, e.g., by a ratchet drive not represented in detail, moves the foremost strip of layers into the freezing frame 30 all the way to the abutment plate 34. Then the carrier plate 22, serving in this case as a bottom support, is retracted by a special drive not represented in detail. This leaves the horizontal cross section of the frame open, so that the strip drops of its own weight into the freezing frame 30. The carrier plate then closes the opening and at the same time the freezing frame 30, driven by a special stepping drive not shown in detail, is lowered by an amount corresponding to the current height of the stack of layers, so that all is ready for the next insertion of a pack of layers. The freezing frame 30 filled in this manner is closed with the loose frame side 31 before it is removed from the filler 18. A bottom plate, not represented, is placed on the frame and the frame 30 is frozen in a freezing tunnel 28.

If the frozen block is recut, e.g., by a chopping action, into portion-size pieces having the height of the original stack of layers, frozen products, e.g., bars, can be made whose layered structure is preferentially perpendicular to the bite in a manner specific to a fish filet.

EMBODIMENT 7

Industrially prepared, comminuted flesh of freshwater fish (e.g., roach, bass or perch), mixed with 1.5% of salt with respect to the mass of the chopped fish, is heated to a core temperature ranging from 0 to −5° C. in preparation for further processing. After the material is coarsely chopped, it is treated in a food processor such that the fish has a particle size of about 70 to 100 microns. To this material is added a commercial pectin (1.0%) and calcium chloride (0.3%). The percentages refer to the mass of the material to be textured. As in the embodiment described in Example 6, a thin sheet of dough is prepared by the roller 2 and provided with a crinkled texture. In contrast to Example 6, however, the cylinders are not warmed. The band of dough, with a thickness of about 5 mm, is transfered to the rotating drum 4, cooled to about −15° C. surface temperature, and by means of the stripping blade 6 and deflector roller 7 it is passed into the immersion bath 10 which contains an aqueous solution of acetic acid and sodium chloride, the concentration of the two components being 3% each, with respect to the total mass of the solution. The band of dough thus stabilized is continuously advanced by means of the endless conveyor 9, while its time of stay in the stabilizing bath, which generally amounts to 3 minutes, can be controlled. The stabilized strip of dough moves over the transfer plate 11 onto the endless conveyor 12 on which water is sprayed onto the dough by the sprayer 13 to remove the superficially adhering acetic acid and salt solution. The strip of dough thus treated is fed to the folder 23 represented in FIG. 2. The portion-sized pieces produced by the strip guiding rolls 24 and the thickening and severing devices 38 and 26, respectively, from the stabilized strip of dough, have preferred dimensions of 95×45×20 mm, and are frozen in the freezing tunnel 28, which in the present embodiment is preferably a counterflow air blast freezer, at about −14° C., preferably in the direction of the crinkle folds. The steak-like frozen portions are preferably breaded after leaving the freezing tunnel 28 and constitute a ready-to-cook product which, due to its great similarity to a filet texture, is a true alternative to the original muscle-tissue filet.

EMBODIMENT 8

Comminuted mackerel flesh produced from frozen raw fish in a known manner by a bone separator, is treated with a suspension of a vegetable protein extract (e.g., field bean protein extract) such that the ratio of field bean protein to the crude protein amounts to 1:10. Polyphosphate is added in the amount of 5% of the total protein content of the mixture. Using a colloid mill while adding a sodium chloride solution, a homogeneous mass is produced in which the fish flesh has particle sizes of about 90 to 120 microns.

The rolling and folding of the fish dough is performed as in Example 6. Due to its composition this dough has a high stability in shaping and conveying operations, so that heating or chilling of the cylinders as in Examples 6 and 7 can be omitted, and the cylinders serve only for the movement of the band of dough. The immersion bath 10 and the sprayers 13 and 14 are likewise not in operation. By means of the endless conveyors 9 and 12, the strip of dough is carried to the folder 15. The production of a frozen block is then performed as in Example 6. After it has been divided into portion-sized pieces, a starting material is obtained which is outstandingly suited to the preparation of high-quality canned fish, whose fish component bears a great similarity to natural fileted fish, and therefore these products distinct from conventional products are made from comminuted fish flesh.

EMBODIMENT 9

Frozen, chopped flesh from fresh-water fish is used as in Example 7, but it was in the frozen state before separation. In the treatment of the thawed material in a food processor 15% of pectin is added, and it is steeped for a period of 10 hours in an excess of water with respect to the crude protein content of the flesh, and rapeseed oil is added in an amount of 20% of the total mass.

The uniformly comminuted material is further treated as in Example 6, and a commercial shrimp flavoring is applied in addition to the vegetable oil in the sprayer 13. In contrast to Example 6, the strip of dough formed on an additional roller 2 without simultaneous heating is not composed of the starting material described above, but consists of a 10% aqueous dispersion of a thermally predenatured field bean protein extract. On an additional roller 2, the preparation and laying on of a third band of dough is performed, which again has the composition described above, and has been treated as in Example 6. The material thus laminated is fed by the endless conveyor 9 to the folder 15. The rest of the process is the same as described in Example 6.

The portions obtained from the frozen block have, after the thermal treatment, a great similarity to shrimp due to the fiber-like parallel alignment of the texture elements and their feel in the mouth, and the shrimp-like flavoring contributes thereto.

We claim:

1. An apparatus for texturizing muscle flesh, comprising a rolling system including a plurality of cylinders for rolling a mass of comminuted muscle flesh into a sheet of dough, means for rotating the plurality of cylinders at differential speeds, rotating drum means for thermally threating the sheet of dough, immersion bath means for containing a stabilizing solution, endless conveyor means for conveying the sheet of dough from the rotating drum through the immersion bath means, first spraying means for removing stabilizing solution from the sheet of dough, second spraying means for applying a fluid to the sheet of dough, and folding means for folding the sheet of dough into a plurality of laminated layers.

2. An apparatus as in claim 2, further comprising severing means for severing a folded plurality of laminated layers from the sheet of dough, freezing frame means for storing strips of the severed plurality of laminated layers one over the other, and filling means for filling strips of the severed plurality of laminated layers into the freezing frame means.

3. An apparatus as in claim 2, wherein the folding means is a strand folding means, and further comprising severing means for severing a folded plurality of laminated layers from the sheet of dough.

4. An apparatus as in claim 2, further comprising at least a second rolling system including a second plurality of cylinders for rolling a second mass of comminuted muscle flesh into a second sheet of dough, means for rotating the second plurality of cylinders at differential speeds, and band laminating means for laminating the rolled sheets of dough.

5. An apparatus as in claim 2, further comprising means for heating the plurality of cylinders.

6. An apparatus as in claim 3, wherein the filling means comprises endless conveyor means for receiving the severed plurality of laminated layers, abutment plate means adjacent the endless conveyor means for stopping movement of the severed plurality of laminated layers along the endless conveyor means, second severing means for cutting the plurality of laminated layers into strips disposed athwart the direction of movement of the endless conveyor means, and drive means for driving the second severing means stepwise.

7. An apparatus as in claim 6, further comprising hydraulic cylinder means for moving said drive means between an upper position and lower position, and guide means for guiding said drive means between said upper and lower positions.

8. An apparatus as in claim 3, wherein said freezing frame means includes a hollow frame, a foam insulating material lining said hollow frame, and a resilient lining covering said foam insulating material.

9. An apparatus as in claim 8, wherein the foam insulating material is selected from the group consisting of polystyrene and polyurethane, and the resilient lining is an elastic corrugated cardboard.

* * * * *